(No Model.)
McD. PATE, S. O. MASON & W. H. DAIL.
CULTIVATOR.
No. 252,508. Patented Jan. 17, 1882.
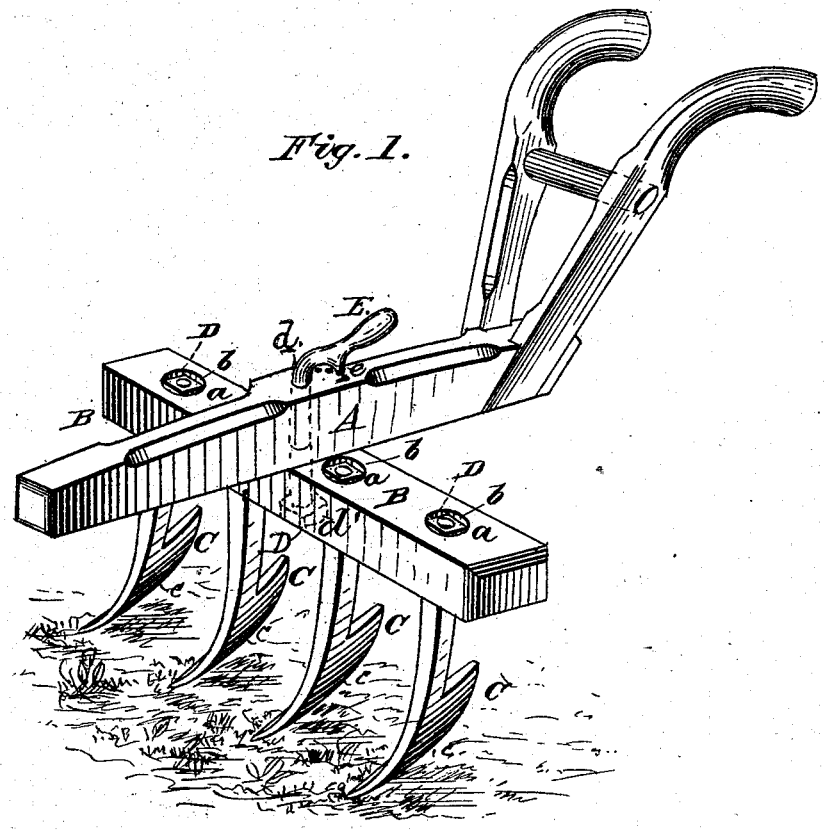
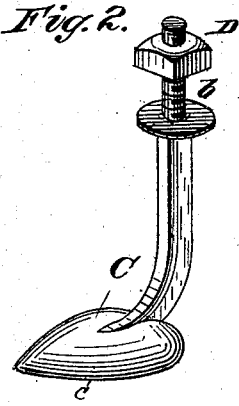
WITNESSES
INVENTOR

UNITED STATES PATENT OFFICE.

McDONALD PATE, SAMUEL O. MASON, AND WILLIAM H. DAIL, OF SNOW HILL, NORTH CAROLINA.

CULTIVATOR.

SPECIFICATION forming part of Letters Patent No. 252,508, dated January 17, 1882.

Application filed August 19, 1881. (No model.)

*To all whom it may concern:*

Be it known that we, MCDONALD PATE, SAMUEL O. MASON, and WILLIAM H. DAIL, citizens of the United States, residing at Snow Hill, in the county of Greene and State of North Carolina, have invented certain new and useful Improvements in Cultivators; and we do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

Our invention relates to improvements in that class of cultivators which are adapted to be used in connection with the ordinary plow-beam; and it consists in the combination, with the ordinary plow-beam, of a cross-beam carrying a series of cultivator plows or shovels, a clamping bolt and nut, and a locking-arm connected to said bolt and adapted to engage the plow-beam for adjustably securing said beams together, all as will be hereinafter more fully described, and pointed out in the claim.

In the drawings forming part of this specification, Figure 1 represents a perspective view of our invention, and Fig. 2 a detail view of the same.

Similar letters of reference indicate like parts in both figures.

Referring to the drawings, A represents the plow-beam of the ordinary construction. B represents the cross-arm, which is suitably connected to the plow beam at or near the center, as fully shown in Fig. 1. The cross-arm B is provided with central vertical holes or openings, $a$, located at suitable distances apart, and which are adapted to receive the shanks $b$ of the cultivator plows or shovels C, said shanks being provided with screw-threads to receive the nuts D, which hold the cultivator-plows firmly in place upon the cross-arm.

By the connection of the shovels C to the cross-arm by means of the screw-threaded shanks $b$ and nuts D, it will be observed that cultivator shovels or plows of different patterns may be readily applied to said cross-arm to suit the different character or nature of the work for which the invention may be desired.

The form of shovels shown in the drawings, and which is deemed preferable, is made large at the shank portion and gradually tapers from thence to the bottom of the blade $c$, which has a curved or rounded face terminating in a sharp edge, as shown. The cross arm or support B carrying these cultivator teeth or shovels is attached to the plow-beam by a screw-bolt and clamping-nut, $d\ d'$, said bolt $d$ having an arm, E, provided with a stud, $e$, adapted to enter one of a series of holes in the beam A, whereby said beam may be adjusted and secured in position so as to stand at or about an angle of forty-five degrees to the same, although this angle may be varied to enable the cultivator-shovels to make narrower or wider rows or to such an angle as may be found desirable to permit them to be used as scrapers.

By means of our improvements we are enabled to furnish a most efficient and simplified form of cultivator, which is capable of a ready adaptation to the many purposes of cultivation for which it is intended.

Having thus described our invention, what we claim as new and useful is—

In a cultivator, the combination, with the beam A, of the cross beam B, carrying a series of cultivator plows or shovels, a clamping bolt and nut, and a locking-arm, E $e$, connected to said bolt and adapted to engage the beam A, for adjustably securing said beams together, substantially in the manner herein shown and described.

In testimony whereof we affix our signatures in presence of two witnesses.

McDONALD PATE.
              SAMUEL O. MASON.
              WILLIAM H. DAIL.

Witnesses:
  N. S. POTTER,
  A. J. GRIFFIN.